UNITED STATES PATENT OFFICE.

EDOUARD COENEN, OF FOREST, BELGIUM.

SCREW-CUTTING HEAD.

1,406,540.  Specification of Letters Patent.  Patented Feb. 14, 1922.

Application filed August 10, 1921. Serial No. 491,204.

*To all whom it may concern:*

Be it known that I, EDOUARD COENEN, citizen of the Kingdom of Belgium, and resident of Forest, Belgium, have invented certain new and useful Improvements Relating to Screw-Cutting Heads, (for which I have filed an application in Belgium May 25, 1920,) of which the following is a specification.

This invention relates to a screw-cutting head particularly adapted to be used in connection with lathes, in order to cut screw-threads during the movement of the slide in both directions under control of the guide-screw; but this screw-cutting head can also be used with tapping machines and other machine-tools.

To this effect, the screw-cutting head comprises a ring adapted to be secured by one of its edges on the slide, instead of the ordinary tool of a lathe, and to be traversed by the bar to be screw-threaded. This ring is provided with radial housings in which are located radially movable tools. It is convenient to provide for instance three tools adapted to be brought in engagement with the bar to be worked during the movement of the slide in one direction and three other tools adapted to work similarly during the return movement of the slide. Each tool is provided with a rack in mesh with a pinion journaled inside the ring, and all these pinions are moved by means of a toothed sleeve controlled by a hand lever. The location of the pinions is such that for one direction of the rotary movement of the sleeve three of the tools are brought towards the bar to be worked while the three tools are removed therefrom.

In order to limit the movement of the tools, the hand lever is provided with a stop which comes into contact with fixed abutments on the ring, adjustment of the length of this movement of the tools being effected by moving the stop along the lever. The ring may also have radially movable bars projecting in the central hollow of the ring and adapted to be brought against the bar to be worked in order to support the latter.

The tools are preferably provided with a number of cutting teeth so as to be shaped like the usual cutting comb of a tapping machine.

The appended drawings show by way of example a preferred embodiment of the invention.

Figure 1:
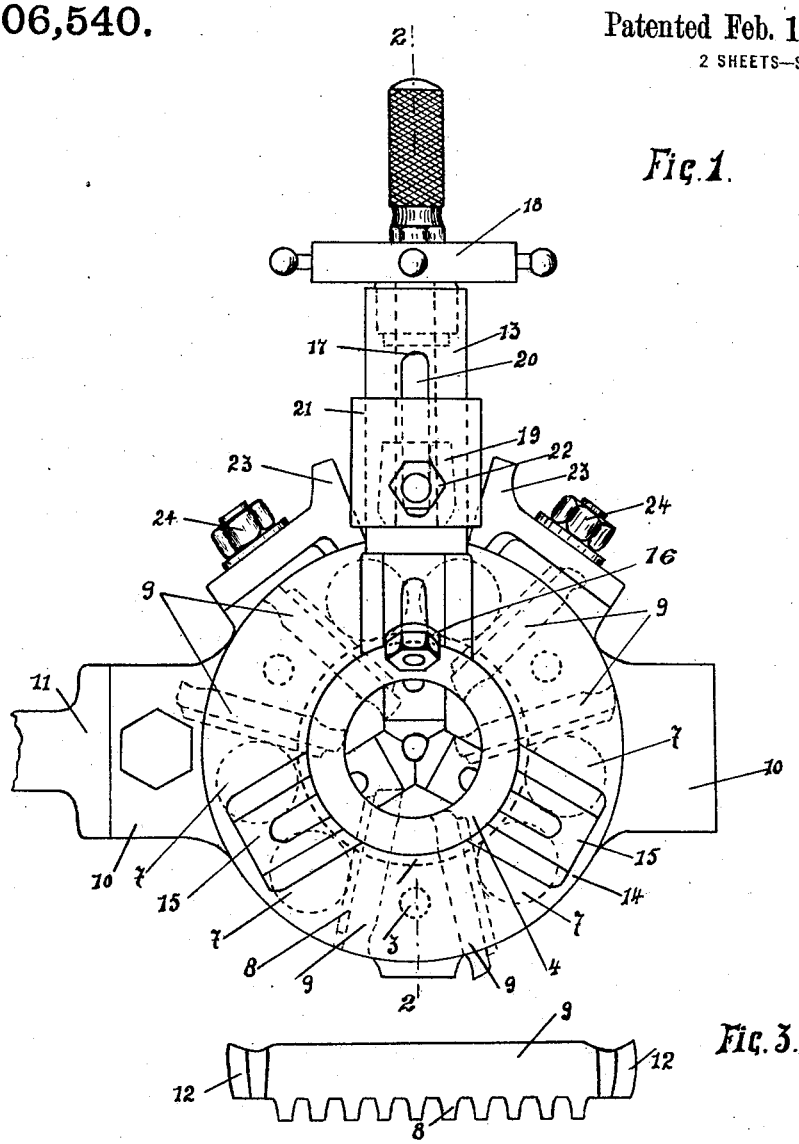
Figure 2:
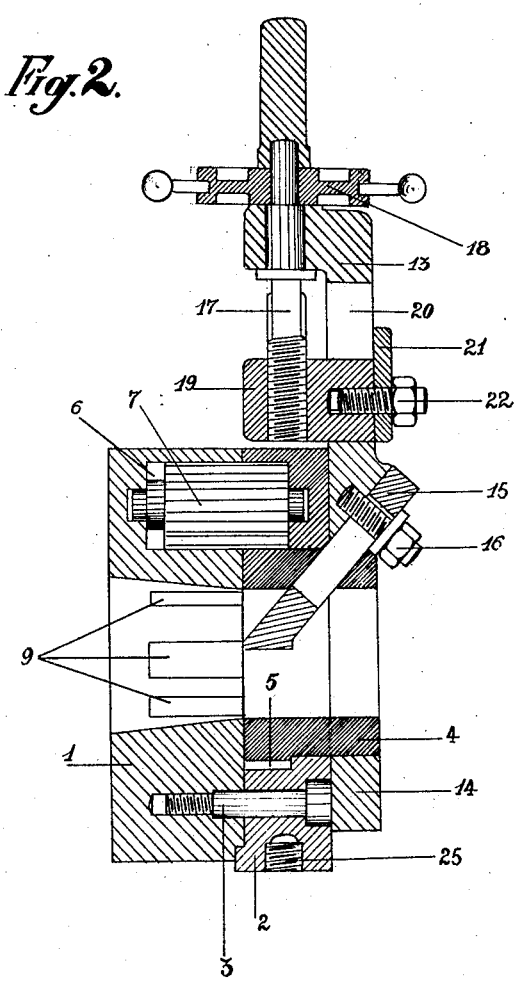

Fig. 1 is an end view of the head; Fig. 2 is a sectional view taken on the line 2—2 of Fig. 1; Fig. 3 is a side view and Fig. 4 is an elevation of a tool on larger scale.

The screw-cutting head comprises a ring formed of two parts 1 and 2, adapted to fit into each other and to be secured to each other by means of screws 3. By fitting into each other, the parts 1 and 2 enclose a sleeve 4 provided with an external toothed crown 5, in such a manner that the said sleeve can turn freely in the head 1—2. The latter is also provided with six cylindrical housings 6 in each of which rotates freely a pinion 7, the journals of which are supported in suitable hollows of the head; said pinions are always in mesh with the external toothed crown 5. Each of them is also in mesh with a rack 8 provided on the back of the tools 9. The latter are six in number and adapted to sliding movement in suitable housings in the head. The arrangement of the pinions is such that on a rotation of the toothed crown 5 in one direction, three of the tools, which are equally spaced on the internal periphery of the ring, are moved inwards while the three other tools move outwards, movements in the reverse direction being brought about by the rotation of the toothed crown 5 in the other direction. The head 1—2 being secured by one of its extensions 10 to the tool holder 11 of the slide of a lathe, it is possible by a suitable rotation of the crown 5 to bring three of the tools in engagement with the work-piece during the displacement of the slide in one direction and the three other tools during the return movement of the slide. The cutting edge of the tools has preferably the shape of teeth 12 adapted to cut a number of threads at a time; cutting edges are provided at both ends of each tool to facilitate replacement when worn out.

The sleeve 4 is moved by means of a hand lever 13 provided with a ring 14 surrounding the end of said sleeve; this ring 14 is secured to the sleeve 4 by means of three bars 15 fixed against supporting faces of ring 14 and passing through the sleeve 4; the inner ends of said bars can be brought into contact with the bar to be worked and the bars are then fixed by means of screws and nuts 16 engaged in a slot of the bars; these bars are thus adapted to support the bar to be worked. The lever 13 carries a screw 17 adapted to rotate without longitudinal movement in a bearing in the lever and to be controlled by a hand wheel 18. Said screw is engaged in a movable nut 19 guided in a slot 20 of lever 13 and secured in position by a plate 21 and set screws 22. The nut 19 serves as a stop for the movement of lever 13; it is adapted to come into contact, for the two opposed end positions of the lever, against abutments 23 secured to part 2 in suitable location, by means of screws 24. The contact surfaces for the nut 19 on the abutments 23 are so angularly arranged that when the nut 19 is moved along the screw 17, the length of the angular movement of the lever 13 is varied; consequently the length of displacement of the tools 9 is also varied, which renders possible the advance movement or inner movement of the tools to the bar to be worked. It is to be noted that on Fig. 1 of the drawings the lever 13 is shown in the middle position while the tools are in the end positions.

It is also to be noted that when in operation, the pressure exerted on the tools by the work-piece has a tendency to turn the lever in a direction which applies the nut 19 with yet more strength against the corresponding abutment 23.

A threaded hole 25 is provided for receiving a screw bearing against the bench of the lathe to supplementarily support the head 1—2.

What I claim is:

1. A screw-cutting head for lathes and other machine tools, comprising a ring provided with radial slide-ways, two groups of tools slidably mounted in said slide-ways, a sleeve concentrically and rotatably mounted in said ring, rack and pinion means operatively connecting said sleeve with said tools whereby rotation of said sleeve in opposite directions brings the two groups of tools alternately into contact with a work-piece in the bore of said ring, and a hand lever connected to said sleeve whereby to operate the same.

2. A screw-cutting head for lathes and other machine-tools, comprising a ring, two groups of tools slidably mounted in said ring, a rack on the back of each tool, a pinion in mesh with the rack of each tool, the arrangement of said pinions and racks being opposite for the successive tools, a toothed sleeve in mesh with all the pinions and adapted to rotate coaxially within the ring, and a hand lever connected to said sleeve.

3. A screw-cutting head for lathes and other machine-tools, comprising a ring, two groups of tools slidably mounted in said ring, a rack on the back of each tool, a pinion in mesh with the rack of each tool, the arrangement of said pinions and racks being opposite for the successive tools, a toothed sleeve in mesh with all the pinions and adapted to rotate coaxially within the ring, a hand lever connected to said sleeve, an adjustable stop on said lever and fixed abutments with angularly arranged contact surfaces provided on the ring for limiting the movement of the lever.

4. A screw-cutting head for lathes and other machine-tools, comprising a ring, two groups of tools slidably mounted in said ring, a rack on the back of each tool, a pinion in mesh with the rack of each tool, the arrangement of said pinions and racks being opposite for the successive tools, a toothed sleeve in mesh with all the pinions and adapted to rotate coaxially within the ring, and a hand lever connected to said sleeve by means of radially adjustable bars adapted to be brought into contact with the work piece to support the latter.

Signed at Brussels Belgium this 7th day of May A. D. 1921.

EDOUARD COENEN.

Witnesses:
G. VANDER HAEYHEN,
L. LEVEI.